United States Patent
Kimura (10) Patent No.: US 11,746,732 B2
(45) Date of Patent: Sep. 5, 2023

(54) AIR INTAKE DUCT FOR INTERNAL COMBUSTION ENGINE

(71) Applicant: TOYOTA BOSHOKU KABUSHIKI KAISHA, Aichi-ken (JP)

(72) Inventor: Ryusuke Kimura, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/764,467

(22) PCT Filed: Dec. 23, 2020

(86) PCT No.: PCT/JP2020/048130
§ 371 (c)(1),
(2) Date: Mar. 28, 2022

(87) PCT Pub. No.: WO2021/153113
PCT Pub. Date: Aug. 5, 2021

(65) Prior Publication Data
US 2022/0333563 A1    Oct. 20, 2022

(30) Foreign Application Priority Data
Jan. 28, 2020 (JP) .................... 2020-011873

(51) Int. Cl.
*F02M 35/10*     (2006.01)
(52) U.S. Cl.
CPC .......... *F02M 35/10098* (2013.01); *F02M 35/10321* (2013.01); *F02M 35/10334* (2013.01)
(58) Field of Classification Search
CPC ....... F02M 35/10098; F02M 35/10321; F02M 35/10334; F02M 35/10; F02M 35/12; F02M 35/1036; F02M 35/1288
See application file for complete search history.

(56) References Cited

U.S. PATENT DOCUMENTS

| 6,553,953 B1 | 4/2003 | Fujihara et al. |
| 2014/0190764 A1* | 7/2014 | Matsumoto ........ F02M 35/1272 181/226 |
| 2018/0298855 A1 | 10/2018 | Kimura |

FOREIGN PATENT DOCUMENTS

| CN | 108730083 | 11/2018 | |
| EP | 1070843 A1 * | 1/2001 | ....... F02M 35/10144 |

(Continued)

OTHER PUBLICATIONS

International Search Report in International Application in PCT/JP2020/048130 filed Feb. 16, 2021, along with an English translation thereof.

(Continued)

*Primary Examiner* — Hung Q Nguyen
(74) *Attorney, Agent, or Firm* — Greenblum & Bernstein, P.L.C.

(57) ABSTRACT

An air intake duct includes a peripheral wall, which is formed by a compressed fiber portion made of a compression molded fiber material. The compressed fiber portion includes high-compression portions having a high compression ratio and low-compression portions having a relatively low compression ratio. The high-compression portions include circumferentially extending sections. Each circumferentially extending section is located in a plane that is perpendicular to an extension direction of the peripheral wall with part of the circumferentially extending section disposed between the low-compression portions. Each circumferentially extending section extends continuously over the entire circumference of the peripheral wall.

5 Claims, 8 Drawing Sheets

(56) References Cited

FOREIGN PATENT DOCUMENTS

| JP | 11-343939 | 12/1999 |
| JP | 2018-178904 | 11/2018 |
| JP | 2019-138208 | 8/2019 |

OTHER PUBLICATIONS

Office Action issued in Corresponding CN Patent Application No. 202080065273.8, dated Mar. 20, 2023, along with an English translation thereof.

* cited by examiner

AIR INTAKE DUCT FOR INTERNAL COMBUSTION ENGINE

TECHNICAL FIELD

The present disclosure relates to an air intake duct for an internal combustion engine.

BACKGROUND ART

Patent Document 1 discloses an air intake duct for an internal combustion engine that is formed by compression molding of a nonwoven fabric containing thermoplastic resin binder. A peripheral wall of the air intake duct includes high-compression portions having a high compression ratio and low-compression portions having a low compression ratio. At least part of the peripheral wall of the above-described air intake duct is formed by low-compression portions, which have a certain degree of air permeability. Thus, some of the sound waves generated by intake air pass through the low-compression portions. This suppresses the generation of standing waves from the sound waves of the intake air, thereby reducing the intake noise.

CITATION LIST

Patent Literature

Patent Literature 1: Japanese Laid-Open Patent Publication No. 11-343939

SUMMARY OF INVENTION

Technical Problem

Although the air intake duct of Patent Document 1 suppresses the generation of standing waves from the sound waves of intake air, sound radiated from the inside of the air intake duct to the outside via the low-compression portions of the peripheral wall may be loud. In this regard, the above-described air intake duct can be improved to suppress intake noise.

Accordingly, it is an objective of the present disclosure to provide an air intake duct for an internal combustion engine that reduces intake noise including radiated sound in a favorable manner.

Solution to Problem

To achieve the foregoing objective, an air intake duct for an internal combustion engine is provided. The air intake duct includes a peripheral wall having an annular cross-sectional shape. At least part of the peripheral wall is formed by a compressed fiber portion that is made of a compression molded fiber material. The compressed fiber portion includes high-compression portions and low-compression portions, the low-compression portions being formed through compression molding at a compression ratio lower than that of the high-compression portions. The high-compression portions include a circumferentially extending section. The circumferentially extending section is located in a plane that is perpendicular to an extension direction of the peripheral wall with at least part of the circumferentially extending section disposed between the low-compression portions. The circumferentially extending section extends continuously over an entire length of the compressed fiber portion in a circumferential direction of the peripheral wall.

In the compressed fiber portion of the above-described configuration, the compression ratio of the fiber material is high in the high-compression portions, and the compression ratio of the fiber material is low in the low-compression portions. Thus, the strength of the sections in which the high-compression portions are disposed is higher than the strength of the sections in which the low-compression portions are disposed. In the above-described configuration, the high-compression portions, which have a high strength, more specifically, the circumferentially extending section, is disposed between the low-compression portions, which have a low strength. Also, the circumferentially extending section is located in a plane perpendicular to the extension direction of the above-described peripheral wall. The circumferentially extending section also extends continuously over the entire length of the compressed fiber portion in the circumferential direction of the peripheral wall. Thus, even though the peripheral wall includes the low-compression portions, which have a low strength, the strength of the sections in which the low-compression portions are disposed is increased as compared to a structure in which the high-compression portions are discontinuous in the circumferential direction or a structure in which the high-compression portions are located in planes other than planes perpendicular to the extension direction of the peripheral wall. Accordingly, the strength of the entire compressed fiber portion is increased. This structure suppresses vibration of the low-compression portions in the thickness direction of the peripheral wall, reducing the sound radiated from the inside of the air intake duct to the outside via the low-compression portions. Further, some of the sound waves of intake air pass through the low-compression portions, which have a certain degree of air permeability. This suppresses the generation of standing waves from the sound waves of the intake air, thereby reducing the intake noise due to resonance. In this manner, the above-described configuration reduces the intake noise including radiated sound in a favorable manner.

DESCRIPTION OF EMBODIMENTS

First Embodiment

An air intake duct for an internal combustion engine according to a first embodiment will now be described.

Figure 1:
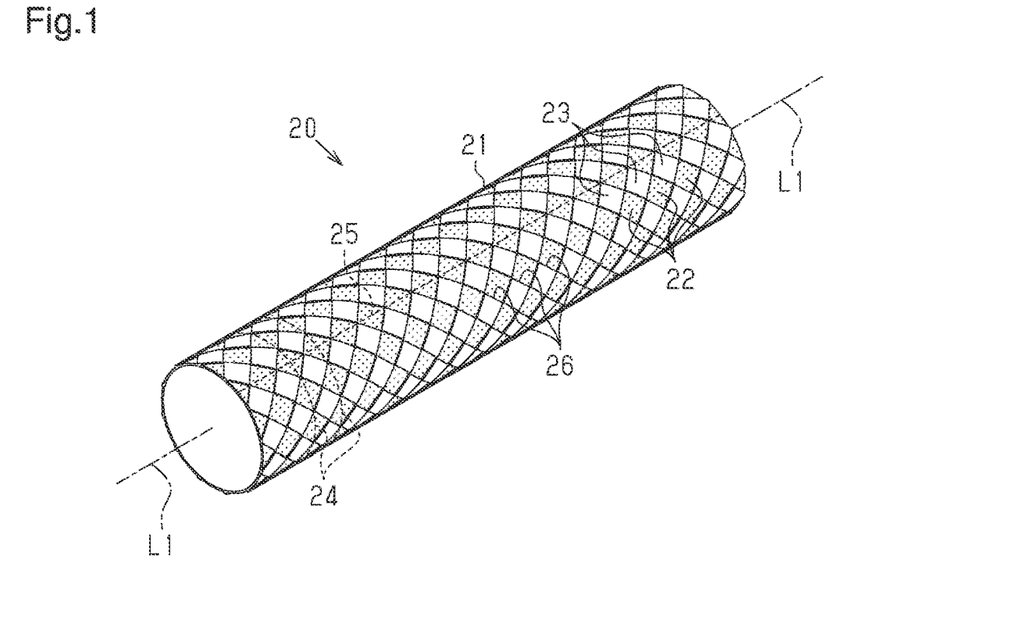
FIG. 1 is a perspective view of an air intake duct for an internal combustion engine according to a first embodiment.
Figure 2:
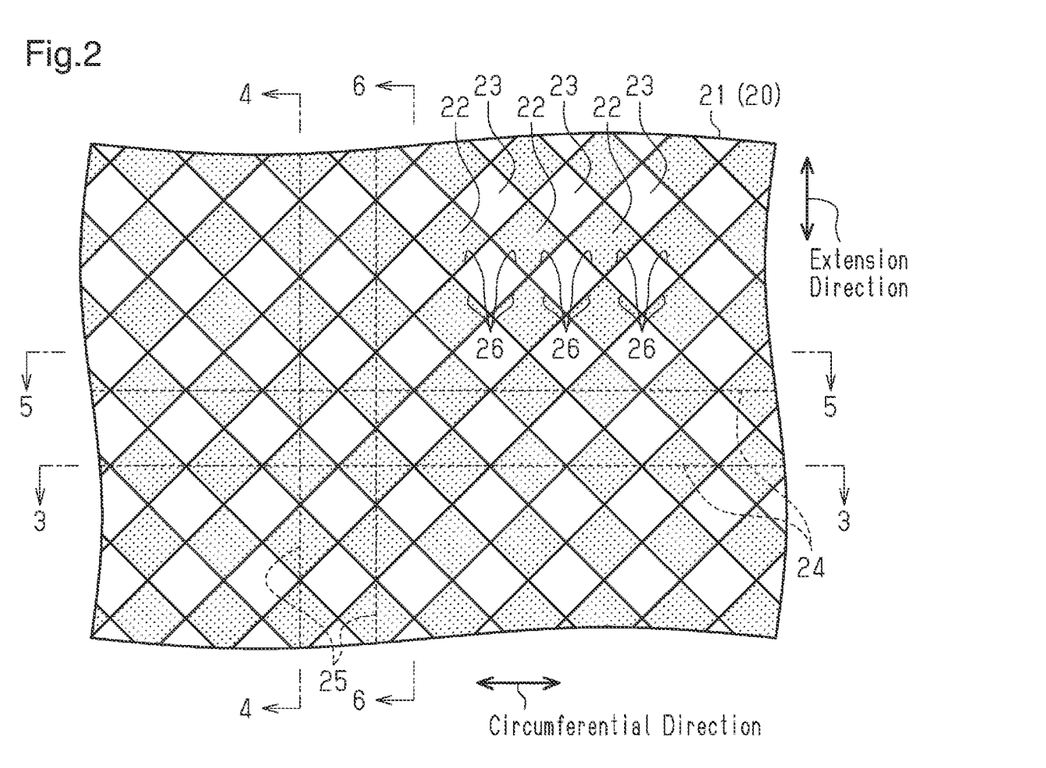
FIG. 2 is a developed view showing a part of a peripheral wall of the air intake duct of FIG. 1 spread into a flat form.

As shown in FIGS. 1 and 2, an air intake duct 20 of the present embodiment includes a cylindrical peripheral wall 21. The air intake duct 20 forms a part of the intake passage of the internal combustion engine.

The peripheral wall 21 of the air intake duct 20 is made of nonwoven fabric subjected to thermal compression molding. In the present embodiment, the entire peripheral wall 21 corresponds to a compressed fiber portion, which is made of a compression molded fiber material. The nonwoven fabric forming the peripheral wall 21 includes a fiber made of polyethylene terephthalate (PET) and a core-sheath fiber (modified PET fiber) having a core made of PET and a sheath made of a low-melting-point PET having a melting point lower than the PET of the core. When the nonwoven fabric is subjected to thermal compression molding, the modified PET fiber is melted to function as a binder. The mixing ratio of the modified PET fiber is preferably from 30 to 70%. In the present embodiment, the mixing ratio of the modified PET is set to 50%. The nonwoven fabric forming the peripheral wall 21 may include a fiber (PP fiber) that is made of polypropylene (PP) having a melting point lower than that of PET, in place of modified PET fiber.

The weight per unit area of the nonwoven fabric is preferably 500 to 1,500 g/m$^2$ (m$^2$ refers to square meter). In the present embodiment, the weight per unit area of the nonwoven fabric is 800 g/m$^2$. The peripheral wall 21 of the air intake duct 20 is formed by hot pressing a nonwoven fabric sheet having a thickness of, for example, 30 mm to 100 mm.

The peripheral wall 21 of the air intake duct 20 includes high-compression portions 22, which are made by thermal compression molding at a relatively high compression ratio, and low-compression portions 23, which are made by thermal compression molding at a compression ratio lower than that of the high-compression portions 22.

The air permeability (as defined in JIS L 1096, A-method (Frazier method)) of the high-compression portions 22 is substantially 0 cm$^3$/cm$^2$·s. The thickness of the high-compression portions 22 is preferably from 0.5 to 1.5 mm. In the present embodiment, the thickness of the high-compression portions 22 is 0.7 mm.

The air permeability of the low-compression portions 23 is 3 cm$^3$/cm$^2$·s. The thickness of the low-compression portions 23 is preferably from 0.8 to 3.0 mm. In the present embodiment, the thickness of the low-compression portions 23 is 1.0 mm.

FIG. 2 shows a part of the peripheral wall 21 spread into a flat state. As shown in FIG. 2, the high-compression portions 22 and the low-compression portions 23 are quadrilateral plates having an identical equilateral quadrilateral shape as viewed in the thickness direction of the peripheral wall 21 (for example, the shape of a square with 10 mm sides).

As shown in FIGS. 1 and 2, the high-compression portions 22 and the low-compression portions 23 are arranged alternately in a first direction (obliquely upward and leftward direction as viewed in FIG. 2). Also, the high-compression portions 22 and the low-compression portions 23 are arranged alternately in a second direction (obliquely upward and rightward direction as viewed in FIG. 2), which intersects with the first direction. The high-compression portions 22 and the low-compression portions 23 are each arranged such that one of the two diagonal lines of the equilateral quadrilateral extends to be parallel with an extension direction, specifically, a center line L1 of the air intake duct 20 (refer to FIG. 1). Also, the high-compression portions 22 and the low-compression portions 23 are each arranged such that the other one of the two diagonal lines of the equilateral quadrilateral is located in a plane perpendicular to the center line L1.

In the air intake duct 20, adjacent ones of the high-compression portions 22 are connected to each other at the four corners of the square shapes.

Figure 3:
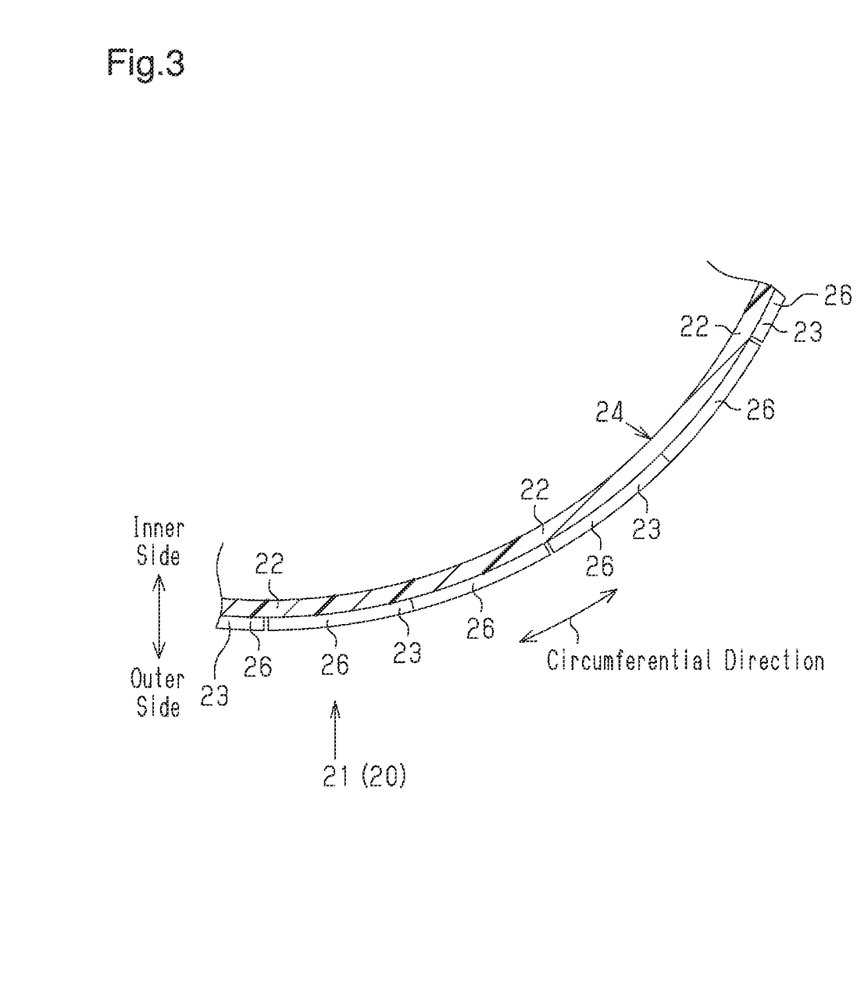
FIG. 3 is a cross-sectional view taken along line 3-3 of FIG. 2.

Accordingly, the high-compression portions 22 in the peripheral wall 21 have circumferentially extending sections 24 as shown in FIGS. 2 and 3. Each circumferentially extending section 24 extends continuously and annularly over the entire circumference of the peripheral wall 21, the circumferentially extending section 24 being partly (specifically, almost entirely) located between the low-compression portions 23. The circumferentially extending sections 24 of the high-compression portions 22 are each located in a plane perpendicular to the center line L1 (refer to FIG. 1). The circumferentially extending sections 24 are formed at positions in the extension direction at which the high-compression portions 22 are arranged.

Figure 4:
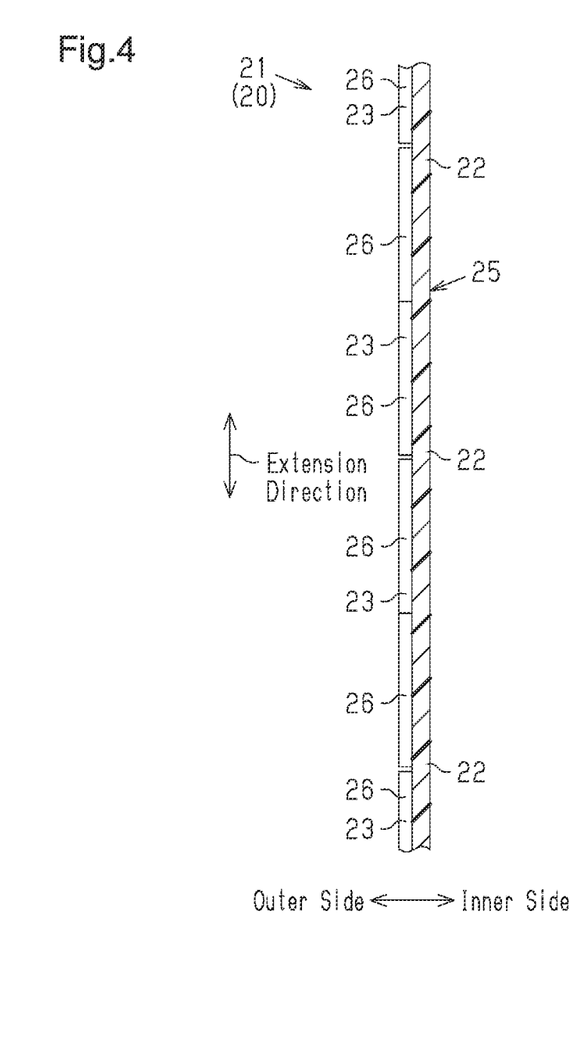
FIG. 4 is a cross-sectional view taken along line 4-4 of FIG. 2.
Figure 5:
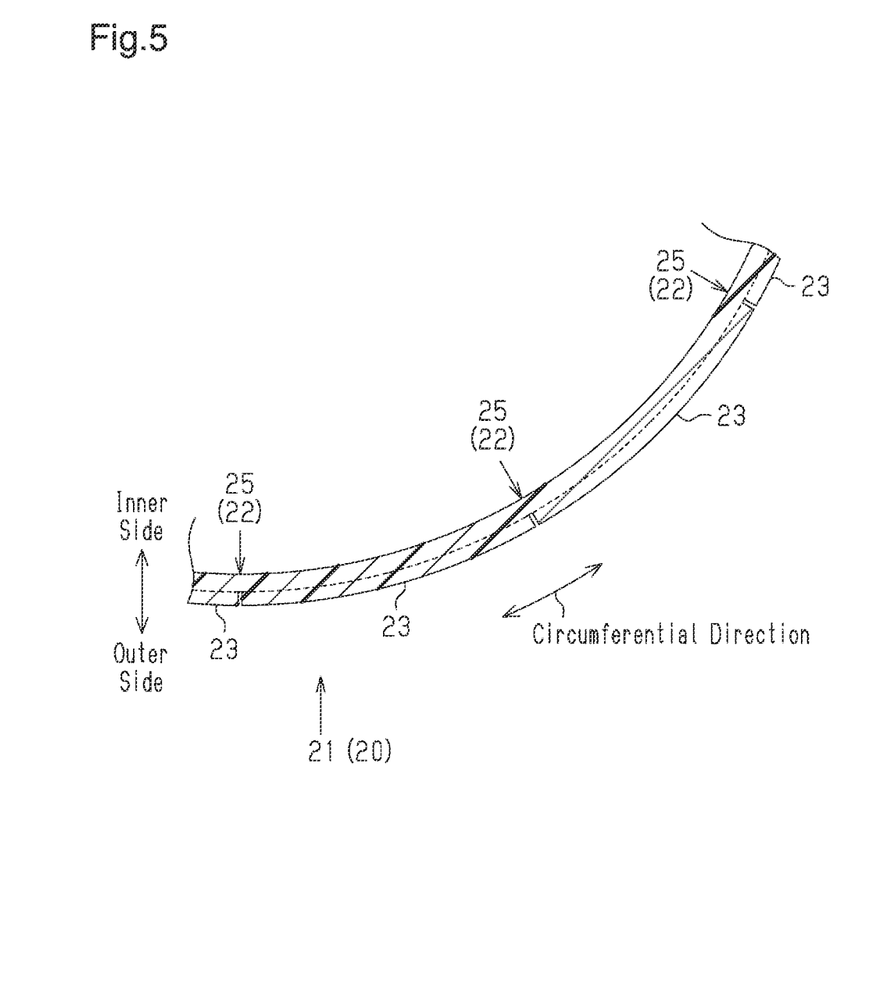
FIG. 5 is a cross-sectional view taken along line 5-5 of FIG. 2.

As shown in FIGS. 2 and 4, the high-compression portions 22 in the peripheral wall 21 have axially extending sections 25. Each axially extending section 25 extends continuously over the entire length in the extension direction of the peripheral wall 21. The axially extending sections 25 of the high-compression portions 22 extend in parallel with the center line L1 (refer to FIG. 1). The axially extending sections 25 are formed at positions in the circumferential direction at which the high-compression portions 22 are arranged.

As shown in FIGS. 3 to 6, the high-compression portions 22 and the low-compression portions 23 are connected to each other via steps 26 on the outer surface of the peripheral wall 21 of the air intake duct 20, while the high-compression portions 22 and the low-compression portions 23 are connected smoothly to each other without a step on the inner surface of the peripheral wall 21.

An operation of the air intake duct 20 of the present embodiment will now be described.

Some of the sound radiated from the inside of the air intake duct 20 to the outside is generated by vibration of the low-compression portions 23 of the air intake duct 20. Thus, increasing the strength of the air intake duct 20 suppresses vibration of the low-compression portions 23, so that the radiated sound is reduced. In the peripheral wall 21 of the air intake duct 20, the compression ratio is high in the high-compression portions 22, and the compression ratio is low in the low-compression portions 23. Thus, the strength of the sections in which the high-compression portions 22 are disposed is higher than the strength of the sections in which the low-compression portions 23 are disposed.

In the air intake duct 20 of the present embodiment, as shown in FIGS. 1 to 3, the high-compression portions 22, which have a high strength, more specifically, the circumferentially extending sections 24, are each disposed between the low-compression portions 23, which have a low strength, and located in a plane perpendicular to the center line L1. The circumferentially extending sections 24 each extend continuously and annularly over the circumference of the peripheral wall 21. Thus, even though the peripheral wall 21 includes the low-compression portions 23, which have a low strength, the strength of the sections in which the low-compression portions 23 are disposed is increased as compared to a structure in which the high-compression portions 22 are discontinuous in the circumferential direction. Accordingly, the strength of the entire peripheral wall 21 is increased. Further, the strength of the entire peripheral wall 21 against a force in a radial direction acting on the peripheral wall 21 is increased, as compared to a structure in which sections of the high-compression portions 22 extending in the circumferential direction are located in planes other than planes perpendicular to the center line L1.

In the air intake duct 20, as shown in FIGS. 1, 2, and 4, the high-compression portions 22, which have a high strength, more specifically, the axially extending sections 25, are each disposed between the low-compression portions 23, which have a low strength, and each extend continuously over the entire length of the peripheral wall 21 in the extension direction of the peripheral wall 21. Thus, the strength of the sections in which the low-compression portions 23 are disposed is increased as compared to a structure in which the high-compression portions 22 are discontinuous in the extension direction. Accordingly, the strength of the entire peripheral wall 21 is increased.

In the air intake duct 20 of the present embodiment, the strength of the entire peripheral wall 21 is increased in the above described manner, so that vibration of the low-compression portions 23 in the thickness direction of the peripheral wall 21 is suppressed. This reduces the sound radiated from the inside of the air intake duct 20 to the outside via the low-compression portions 23.

Also, as shown FIGS. 1 and 2, in the air intake duct 20 of the present embodiment, the high-compression portions 22 and the low-compression portions 23 have an identical square outer shape as viewed in the thickness direction of the peripheral wall 21. Also, the high-compression portions 22 and the low-compression portions 23 are arranged alternately in both the first direction and the second direction. This arrangement structure allows a large number of the low-compression portions 23, which have small areas, to be provided in a state of being surrounded on all four sides by the high-compression portions 22. Accordingly, even though the peripheral wall 21 includes the low-compression portions 23 of a relatively low strength, the length of continuously extending section in each low-compression portion 23 is reduced. The low-compression portions 23 thus have a structure that is not vibrated easily. This structure also reduces the sound radiated from the inside of the air intake duct 20 to the outside via the low-compression portions 23.

In the air intake duct 20 of the present embodiment, some of the sound waves of intake air pass through the low-compression portions 23, which have a certain degree of air permeability. This suppresses the generation of standing waves from the sound waves of the intake air, thereby reducing the intake noise due to resonance.

Figure 7A:
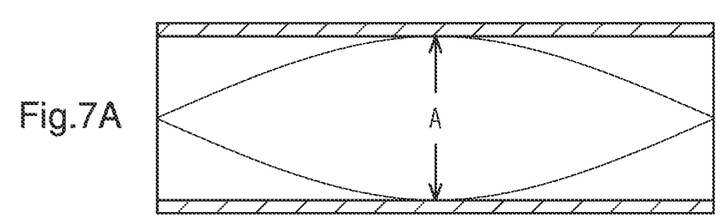
FIGS. 7A to 7C are schematic diagrams each showing the pressure distribution of a standing wave from a sound wave of intake air generated inside the air intake duct.
Figure 7B:
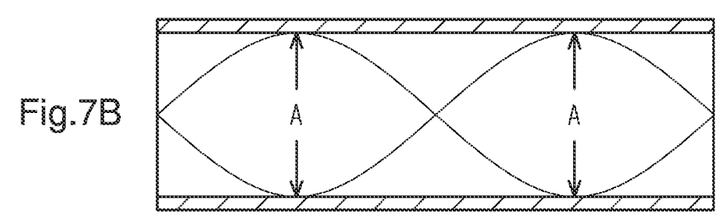
Figure 7C:
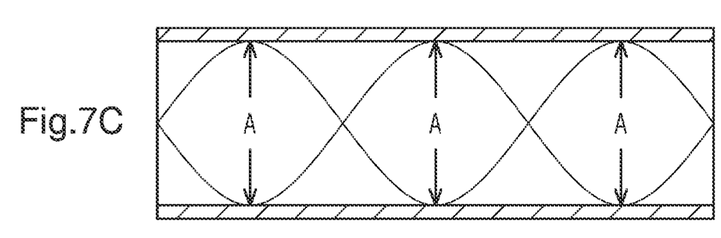

As shown in FIGS. 7A to 7C, the positions corresponding to antinodes A of a standing wave from a sound wave of intake air, that is, the positions where the sound pressure of the standing wave is highest, vary depending on the frequency (wavelength) of the standing wave. In the air intake duct 20, if there is a low-compression portion 23 having air permeability at a position corresponding to an antinode A of a standing wave from the sound wave of intake air, the pressure of the sound wave of the intake air is relieved through the low-compression portion 23. This suppresses the generation of standing waves effectively.

Figure 6:
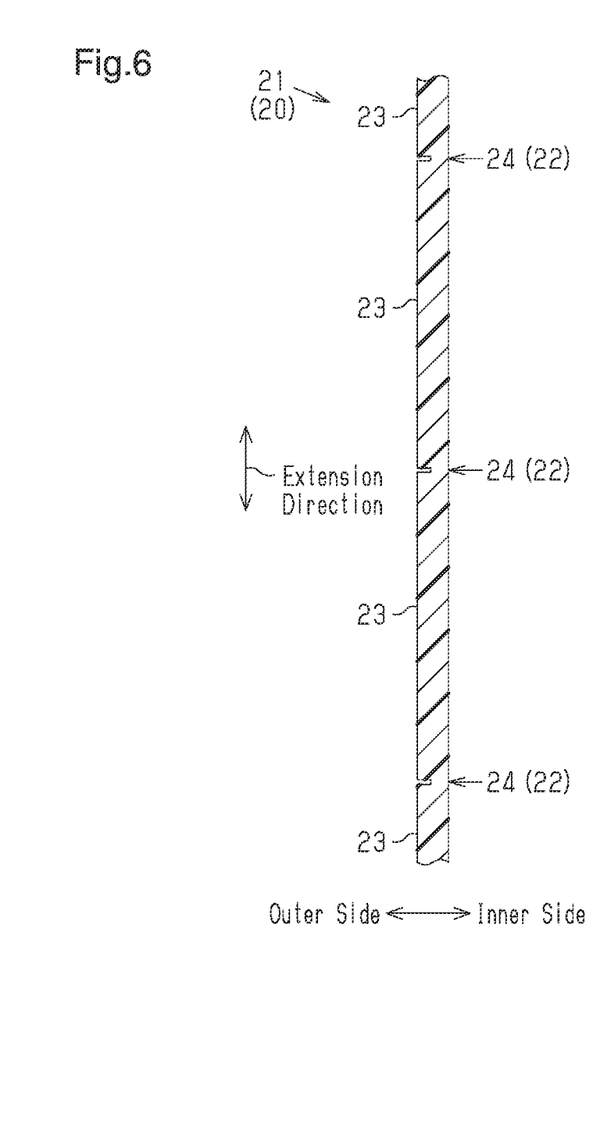
FIG. 6 is a cross-sectional view taken along line 6-6 of FIG. 2.

In the air intake duct 20 of the present embodiment, as shown in FIGS. 1, 2, and 6, the low-compression portions 23 are disposed substantially at all the positions in the extension direction of the peripheral wall 21. Accordingly, in the present embodiment, it can be said that the low-compression portions 23 are arranged over substantially the entire length in the extension direction of the peripheral wall 21. Thus, the low-compression portions 23 are present at positions corresponding to the antinodes A of the standing waves of various frequencies that can be generated inside the air intake duct 20. This reduces intake noise in a wide range of frequencies.

Figure 8:
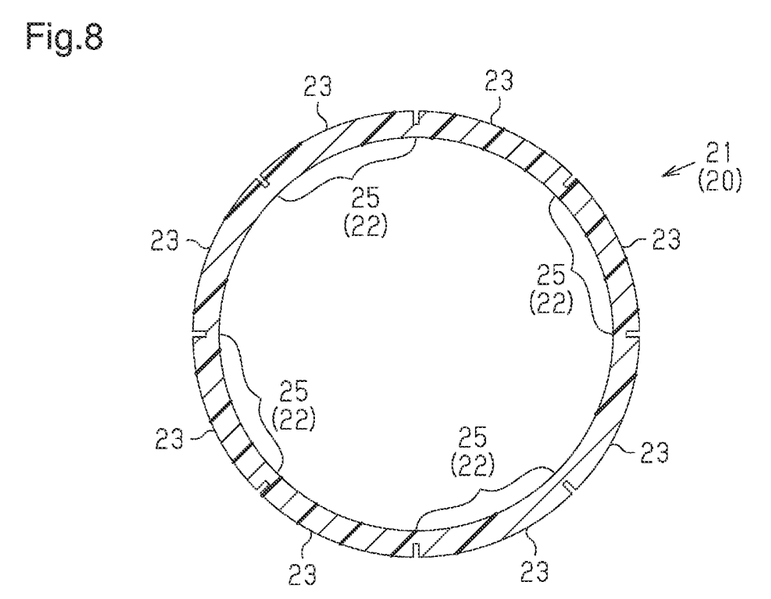
FIG. 8 is a cross-sectional side view of the air intake duct.

Also, the high-compression portions 22 and the low-compression portions 23 are arranged alternately in the air intake duct 20. Accordingly, as in an example shown in FIG. 8, the low-compression portions 23 are evenly arranged in the circumferential direction of the peripheral wall 21. Thus, the pressure of the sound wave of the intake air is relieved in a well-balanced manner through the low-compression portions 23 in each section in the circumferential direction of the peripheral wall 21. This suppresses the generation of standing waves effectively. In FIG. 8, the number of the low-compression portions 23 arranged in the circumferential direction, the thickness of the high-compression portions 22, and the thickness of the low-compression portions 23, are exaggerated in comparison with the actual numbers and thicknesses in order to facilitate understanding.

As described above, the air intake duct 20 of the present embodiment is capable of reducing intake noise including radiated sound in a favorable manner.

As shown in FIGS. 1 and 2, in the air intake duct 20 of the present embodiment, the high-compression portions 22 and the low-compression portions 23 each have the shape of a rhombus (specifically, a square) that has a diagonal line located in a plane perpendicular to the center line L1. This creates a pattern on the outer surface of the peripheral wall 21 in which the squares of an identical shape are arranged regularly in the extension direction and the circumferential direction, thereby improving the design of the air intake duct 20.

Figure 9:
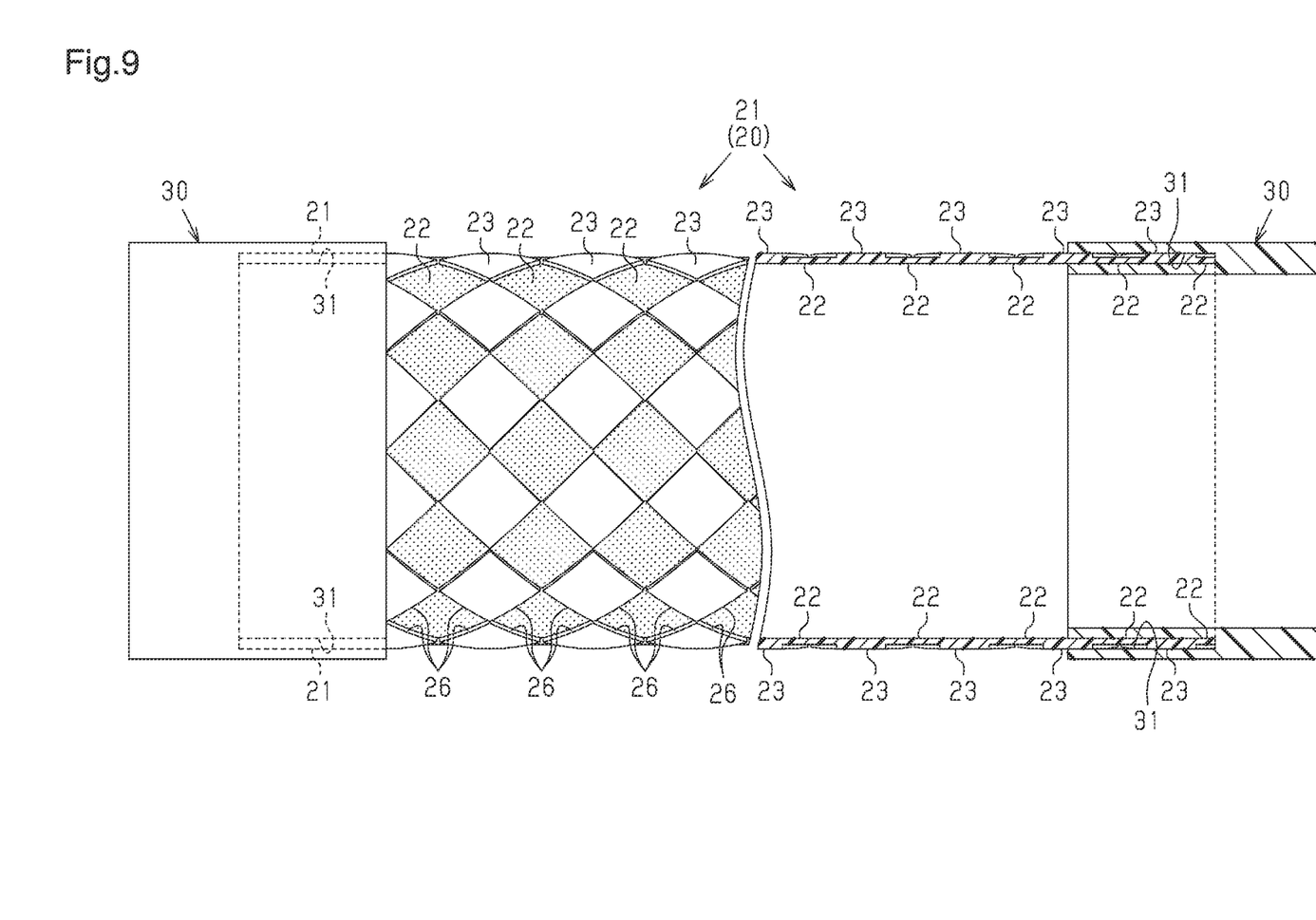
FIG. 9 is a partial cross-sectional view showing a structure for installing the air intake duct.

When installing the air intake duct 20, tubular fixing portions 30 are attached to the opposite ends of the air intake duct 20 as shown in FIG. 9. Each fixing portion 30 has an engagement groove 31 in an end face in the extension direction. The engagement groove 31 extends annularly over the entire circumference. The width of the engagement groove 31 of the fixing portion 30 is less than the thickness of the low-compression portions 23 in the peripheral wall 21.

When each fixing portion 30 is attached to the air intake duct 20, an end in the extension direction of the peripheral wall 21 is fitted to the engagement groove 31 of the fixing portion 30 while being compressed in the thickness direction. This generates a predetermined surface pressure in the contacting portion between the inner circumferential surface of the end of the peripheral wall 21 and the inner surface of the engagement groove 31 of the fixing portion 30, sealing the gap between the peripheral wall 21 and the fixing portion 30.

In the present embodiment, the inner circumferential surface of the peripheral wall 21 is smooth and has no step. Specifically, the inner circumferential surface is substantially cylindrical. Thus, the inner circumferential surface of the end of the peripheral wall 21 of the air intake duct 20 is smooth regardless of the position in the extension direction of the peripheral wall 21 at which the air intake duct 20 is cut. Accordingly, when the fixing portion 30 is attached to the air intake duct 20, the inner circumferential surface of the peripheral wall 21 and the inner surface of the engagement groove 31 of the fixing portion 30 are brought into close contact over the entire circumference. Therefore, in order to achieve a proper sealing performance, it is not necessary to strictly determine the position at which the peripheral wall 21 is cut or to form the engagement groove 31 into a complicated shape to agree with the cross-sectional shape of the peripheral wall. Hence, the structure of the parts where the air intake duct 20 and the fixing portion 30 are connected can be simplified, facilitating attachment of the fixing portion 30 to the air intake duct 20.

As described above, the present embodiment provides the following advantages.

(1) In the air intake duct 20 of the present embodiment, the high-compression portions 22, which have a high strength, include the circumferentially extending sections 24. Most of each circumferentially extending section 24 is disposed between the low-compression portions 23 and located in a plane perpendicular to the center line L1. Each circumferentially extending section 24 extends continuously and annularly over the entire circumference of the peripheral wall 21. Thus, the strength of the sections in which the low-compression portions 23 are disposed is increased as compared to a structure in which the high-compression portions 22 are discontinuous in the circumferential direction. Accordingly, the strength of the entire peripheral wall 21 is increased. This reduces the sound radiated from the inside of the air intake duct 20 to the outside via the low-compression portions 23. Further, some of the sound waves of intake air pass through the low-compression portions 23, which have a certain degree of air permeability. This suppresses the generation of standing waves from the sound waves of the intake air, thereby reducing the intake noise due to resonance. In this manner, the air intake duct 20 reduces the intake noise including radiated sound in a favorable manner.

(2) In the air intake duct 20 of the present embodiment, the high-compression portions 22, which have a high strength, include the axially extending sections 25. Most of each axially extending section 25 is disposed between the low-compression portions 23 and extends continuously in the extension direction of the peripheral wall 21 over the entire length of the peripheral wall 21. Thus, the strength of the sections in which the low-compression portions 23 are disposed is increased as compared to a structure in which the high-compression portions 22 are discontinuous in the extension direction. Accordingly, the strength of the entire peripheral wall 21 is increased.

(3) The high-compression portions 22 and the low-compression portions 23 are quadrilateral plates having an identical square shape as viewed in the thickness direction of the peripheral wall 21. Also, the high-compression portions 22 and the low-compression portions 23 are arranged alternately in both the first direction and the second direction. Adjacent ones of the high-compression portions 22 are connected to each other at corners of the shapes of quadrilateral plates. Accordingly, the circumferentially extending sections 24 of the high-compression portions 22 extend annularly over the entire circumference of the peripheral wall 21. Further, since the low-compression portions 23 are arranged at almost all positions in the extension direction of the peripheral wall 21, the intake noise due to resonance is suppressed over a wide frequency range. Also, since the low-compression portions 23 are evenly arranged at almost all positions in the circumferential direction of the peripheral wall 21, the radiated sound is suppressed over a wide frequency range in a well-balanced manner.

(4) The high-compression portions 22 and the low-compression portions 23 each have the shape of a square that has a diagonal line located in a plane perpendicular to the center line L1. This creates a pattern on the outer surface of the peripheral wall 21 in which the squares of an identical shape are arranged regularly in the extension direction and the circumferential direction, thereby improving the design of the air intake duct 20.

Second Embodiment

An air intake duct according to a second embodiment will now be described. Differences from the air intake duct according to the first embodiment will mainly be discussed. Like or the same reference numerals or corresponding reference numerals are given to those components that are similar to the corresponding components of the first embodiment, and detailed explanations are omitted.

The second embodiment is different from the first embodiment in the following point. In the air intake duct of the first embodiment, the peripheral wall is entirely formed by a compressed fiber portion, which is made by compression molding. In the air intake duct of the second embodiment, the peripheral wall is partly formed by a compressed fiber portion.

An air intake duct 40 according to the second embodiment will now be described.

Figure 10:
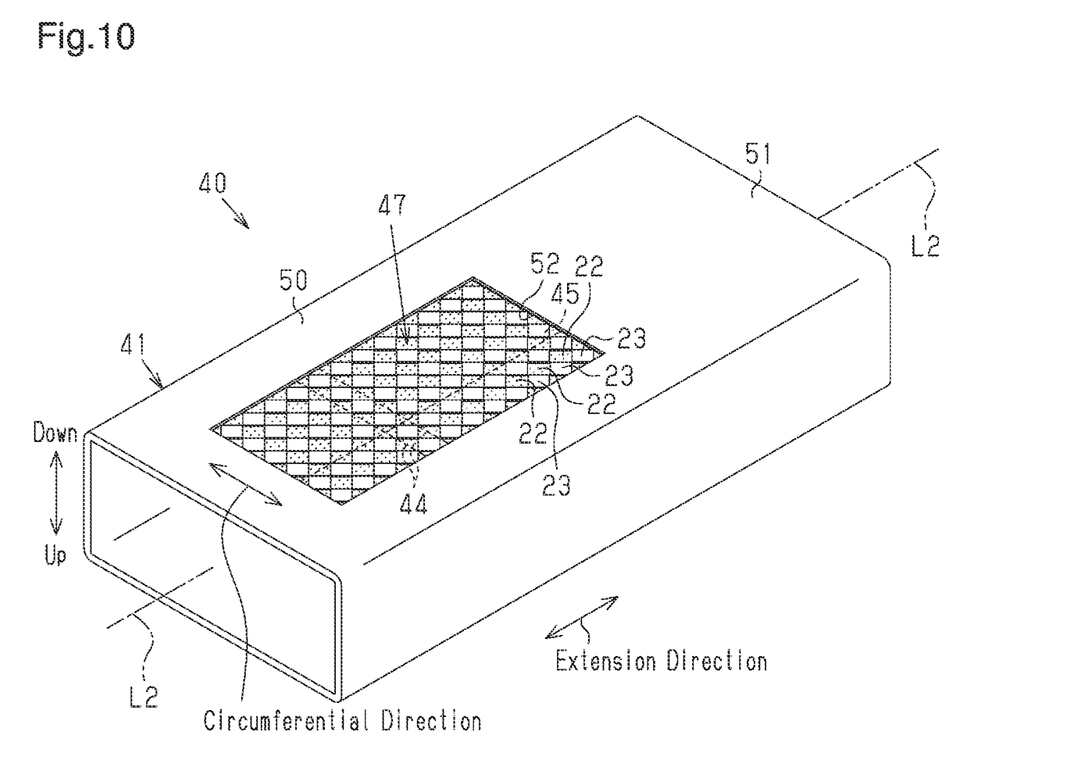
FIG. 10 is a perspective view from obliquely below, showing an air intake duct for an internal combustion engine according to a second embodiment.

As shown in FIG. 10, the air intake duct 40 of the present embodiment includes a peripheral wall 41 having the shape of a quadrilateral tube. The peripheral wall 41 includes a duct body 50, which is made of a hard plastic and has the shape of a quadrilateral tube, and a compressed fiber portion 47 made of nonwoven fabric.

The duct body 50 has the shape of a quadrilateral tube. The lower part (upper part as viewed in FIG. 10) of the duct body 50 is formed by a bottom wall 51. The bottom wall 51 has an open window 52, which has a substantially rectangular shape and extends through the bottom wall 51.

The compressed fiber portion 47 has the outer shape of a rectangular flat plate. The compressed fiber portion 47 is attached to the duct body 50 so as to close the open window 52 in the bottom wall 51 of the duct body 50. Specifically, the open window 52 includes an annular engagement groove (not shown) over the entire perimeter of the inner peripheral surface. The outer edge of the compressed fiber portion 47 is fitted into the engagement groove of the duct body 50 while being compressed in the thickness direction. This generates a predetermined surface pressure in the contacting portion between the inner surface of the engagement groove of the duct body 50 and the outer edge of the compressed fiber portion 47, sealing the gap between the duct body 50 and the compressed fiber portion 47.

The compressed fiber portion 47 includes high-compression portions 22, which are made by thermal compression molding at a high compression ratio, and low-compression portions 23, which are made by thermal compression molding at a relatively low compression ratio.

Figure 11:
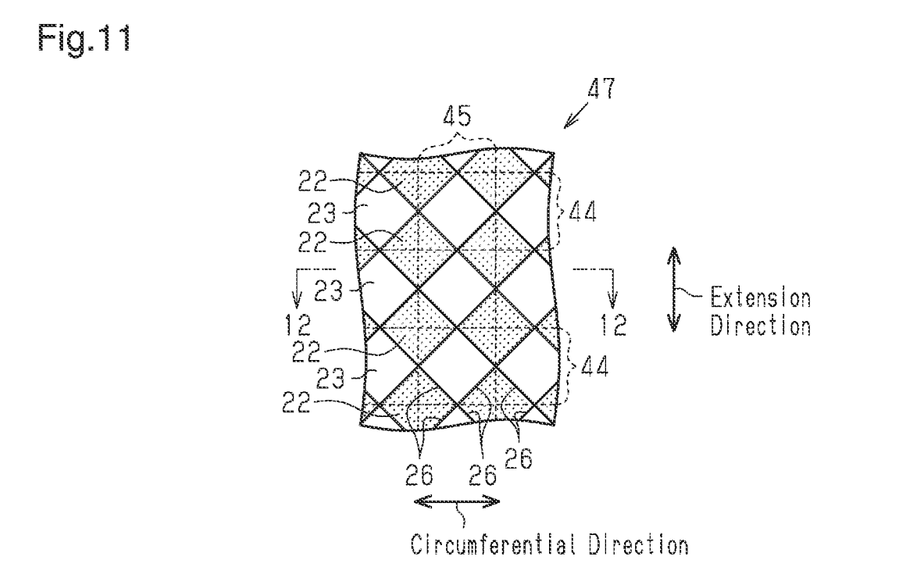
FIG. 11 is an enlarged bottom view showing a part of a compressed fiber portion of the air intake duct.

As shown in FIGS. 10 and 11, the high-compression portions 22 and the low-compression portions 23 are quadrilateral plates having an identical rhombus shape (specifically, an equilateral quadrilateral shape) as viewed in the thickness direction of the compressed fiber portion 47.

The high-compression portions 22 and the low-compression portions 23 are arranged alternately in a first direction (obliquely upward and leftward direction as viewed in FIG. 11). Also, the high-compression portions 22 and the low-compression portions 23 are arranged alternately in a second direction (obliquely upward and rightward direction as viewed in FIG. 11). The high-compression portions 22 and the low-compression portions 23 are each arranged such that one of the two diagonal lines of the equilateral quadrilateral extends to be parallel with an extension direction, specifically, a center line L2 of the air intake duct 40 (refer to FIG. 10). Also, the high-compression portions 22 and the low-compression portions 23 are each arranged such that the other one of the two diagonal lines of the equilateral quadrilateral is located in a plane perpendicular to the center line L2. Adjacent ones of the high-compression portions 22 are connected to each other at the four corners of the square shapes.

Accordingly, the high-compression portions 22 in the compressed fiber portion 47 have circumferentially extending sections 44. Each circumferentially extending section 44 extends continuously over the entire length in the circumferential direction of the compressed fiber portion 47 while being partly (specifically, almost entirely) located between the low-compression portions 23. The circumferentially extending sections 44 of the high-compression portions 22 are each located in a plane perpendicular to the center line L2. The circumferentially extending sections 44 are formed at positions in the extension direction at which the high-compression portions 22 are arranged.

Also, the high-compression portions 22 in the compressed fiber portion 47 have axially extending sections 45. Each axially extending section 45 extends continuously over the entire length in the extension direction of the compressed fiber portion 47. The axially extending sections 45 of the high-compression portions 22 extend in parallel with the center line L2. The axially extending sections 45 are formed at positions in the circumferential direction at which the high-compression portions 22 are arranged.

Figure 12:
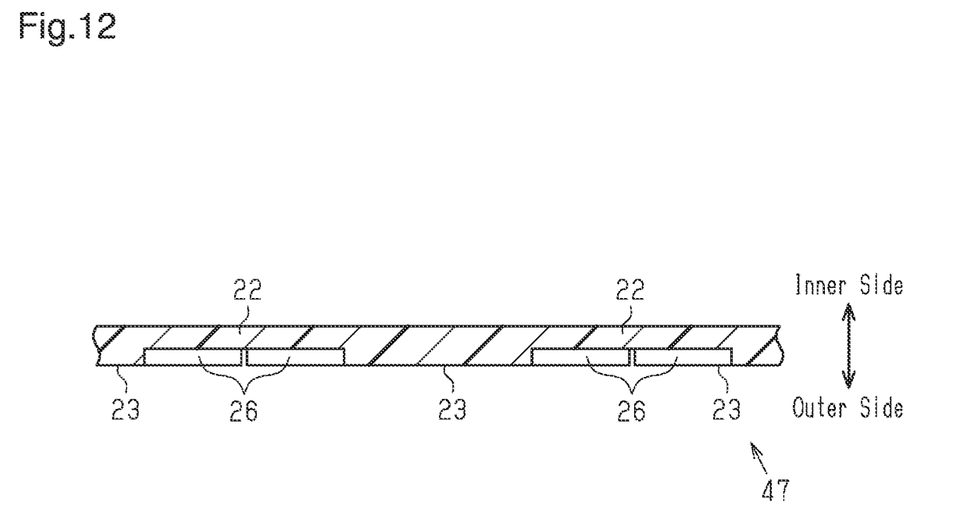
FIG. 12 is a cross-sectional view taken along line 12-12 of FIG. 11.

As shown in FIG. 12, the high-compression portions 22 and the low-compression portions 23 are connected to each other via steps 26 on the outer surface of the compressed fiber portion 47 while the high-compression portions 22 and the low-compression portions 23 are connected smoothly to each other without a step on the inner surface of the compressed fiber portion 47.

An operation of the air intake duct 40 of the present embodiment will now be described.

In the air intake duct 40 of the present embodiment, the high-compression portions 22, which have a high strength, more specifically, the circumferentially extending sections 44, are each disposed between the low-compression portions 23, which have a low strength. The circumferentially extending sections 44 are each located in plane perpendicular to the center line L2. The circumferentially extending sections 44 each extend continuously over the entire length in the circumferential direction of the compressed fiber portion 47. Thus, even though the compressed fiber portion 47 includes the low-compression portions 23, which have a low strength, the strength of the sections in which the low-compression portions 23 are disposed is increased as compared to a structure in which the high-compression portions 22 are discontinuous in the circumferential direction. Accordingly, the strength of the entire compressed fiber portion 47 is increased. Further, as compared to a structure in which each section that extends in the circumferential direction of the high-compression portions 22 is located in a plane other than a plane perpendicular to the center line L2, the length of those sections in the circumferential direction is short. This structure increases the strength of the entire compressed fiber portion 47 against a force in the thickness direction acting on the compressed fiber portion 47.

In the air intake duct 40, the high-compression portions 22, which have a high strength, more specifically, the axially extending sections 45, are each disposed between the low-compression portions 23, which have a low strength, and each extend continuously over the entire length in the extension direction of the compressed fiber portion 47. Thus, the strength of the sections in which the low-compression portions 23 are disposed is increased as compared to a structure in which the high-compression portions 22 are discontinuous in the extension direction. Accordingly, the strength of the entire compressed fiber portion 47 is increased.

In the air intake duct 40 of the present embodiment, the strength of the entire compressed fiber portion 47 is increased in the above described manner, so that vibration of the low-compression portions 23 in the thickness direction of the compressed fiber portion 47 is suppressed. This reduces the sound radiated from the inside of the air intake duct 40 to the outside via the low-compression portions 23.

In the air intake duct 40 of the present embodiment, some of the sound waves of intake air pass through the low-compression portions 23, which have a certain degree of air permeability. This suppresses the generation of standing waves from the sound waves of the intake air, thereby reducing the intake noise due to resonance.

As shown in FIGS. 10 and 11, the low-compression portions 23 are disposed substantially at all of the positions in the extension direction in the compressed fiber portion 47 of the air intake duct 40. Accordingly, in the present embodiment, it can be said that the low-compression portions 23 are arranged over substantially the entire length in the extension direction of the compressed fiber portion 47. Thus, the low-compression portions 23 are present at positions corresponding to the antinodes A (refer to FIGS. 7A to 7C) of the standing waves of various frequencies that can be generated inside the air intake duct 40. This reduces intake noise in a wide range of frequencies.

Also, the high-compression portions 22 and the low-compression portions 23 are arranged alternately in the air intake duct 40. Accordingly, the low-compression portions 23 are evenly arranged in the circumferential direction of the compressed fiber portion 47. Thus, the pressure of the sound waves of the intake air is relieved in a well-balanced manner through the low-compression portions 23 in each section in the circumferential direction of the compressed fiber portion 47. This suppresses the generation of standing waves effectively.

As described above, the air intake duct 40 of the present embodiment is capable of reducing intake noise including radiated sound in a favorable manner.

As described above, the present embodiment provides the following advantages.

(5) In the air intake duct 40 of the present embodiment, the high-compression portions 22, which have a high strength, include the circumferentially extending sections 44. Most of each circumferentially extending section 44 is disposed between the low-compression portions 23 and is located in a plane perpendicular to the center line L2. Each circumferentially extending section 44 extends continuously over the entire length in the circumferential direction of the compressed fiber portion 47. The strength of the entire compressed fiber portion 47 is thus increased. This reduces the sound radiated from the inside of the air intake duct 40 to the outside via the low-compression portions 23. Further, some of the sound waves of intake air pass through the low-compression portions 23, which have a certain degree of air permeability. This suppresses the generation of standing waves from the sound wave of the intake air, thereby reducing the intake noise due to resonance. In this manner, the air intake duct 40 reduces the intake noise including radiated sound in a favorable manner.

(6) In the air intake duct 40 of the present embodiment, the high-compression portions 22, which have a high strength, include the axially extending sections 45. Most of each axially extending section 45 is disposed between the low-compression portions 23 and extends continuously in the extension direction over the entire length of the compressed fiber portion 47. Thus, the strength of the entire compressed fiber portion 47 is increased as compared to a structure in which the high-compression portions 22 are discontinuous in the extension direction.

(7) The high-compression portions 22 and the low-compression portions 23 are quadrilateral plates having an identical square shape as viewed in the thickness direction of the compressed fiber portion 47. Also, the high-compression portions 22 and the low-compression portions 23 are arranged alternately in both the first direction and the second direction. Adjacent ones of the high-compression portions 22 are connected to each other at corners of the shapes of quadrilateral plates. Accordingly, the circumferentially extending sections 44 of the high-compression portions 22 extend over the entire length in the circumferential direction of the compressed fiber portion 47. Further, since the low-compression portions 23 are arranged at almost all positions in the extension direction of the compressed fiber portion 47, the intake noise due to resonance is suppressed over a wide frequency range. Also, since the low-compression portions 23 are evenly arranged at almost all positions in the circumferential direction of the compressed fiber portion 47, the radiated sound is suppressed over a wide frequency range in a well-balanced manner.

(8) The high-compression portions 22 and the low-compression portions 23 each have the shape of a square that has a diagonal line located in a plane perpendicular to the center line L2. This creates a pattern on the outer surface of the compressed fiber portion 47 in which the squares of an identical shape are arranged regularly in the extension direction and the circumferential direction, thereby improving the design of the air intake duct 40.

Other Embodiments

The above-described embodiments may be modified as follows. The above-described embodiments and the following modifications can be combined as long as the combined modifications remain technically consistent with each other.

In the first embodiment, the procedure for forming the peripheral wall 21 is not limited to the one in which a cylindrical peripheral wall is formed by subjecting nonwoven fabric to thermal compression molding. For example, the procedure for forming the peripheral wall 21 may be a procedure in which nonwoven fabric is subjected to thermal compression molding to form multiple (for example, two) split parts having an arcuate cross-sectional shape, and the split parts are joined to each other to form a cylindrical shape.

In the first embodiment, a cylindrical compressed fiber portion B, which includes high-compression portions 22 and low-compression portions 23, may be arranged in a part (for example, a middle part or an end part) in the extension direction of a peripheral wall of an air intake duct. In this structure, the parts of the peripheral wall other than the compressed fiber portion B may be made of a hard plastic or a high-compression portion, which is made by thermal compression molding at a high compression ratio.

In the first embodiment, the structure for installing the air intake duct 20 is not limited to the one that uses the fixing portions 30, but may be changed.

In the second embodiment, the method for attaching the compressed fiber portion 47 to the duct body 50 may be changed, for example, to fixation using screws, fixation by swaging, or fixation by joining (bonding or welding).

In the first embodiment, the directions in which the high-compression portions 22 and the low-compression portions 23 are arranged alternately (in both the first direction and the second direction) may be changed as long as parts of the high-compression portions 22 form circumferentially extending sections 24, which are each located in a plane perpendicular to the center line L1 and extend continuously and annularly over the entire length of the peripheral wall 21 in the circumferential direction. In the second embodiment, the directions in which the high-compression portions 22 and the low-compression portions 23 are arranged alternately (in both the first direction and the second direction) may be changed as long as parts of the high-compression portions 22 form circumferentially extending sections 44, which are each located in a plane perpendicular to the center line L2 and extend continuously over the entire length of the compressed fiber portion 47 in the circumferential direction. For example, the first direction and the second direction may be set in the following manner.

Figure 13:
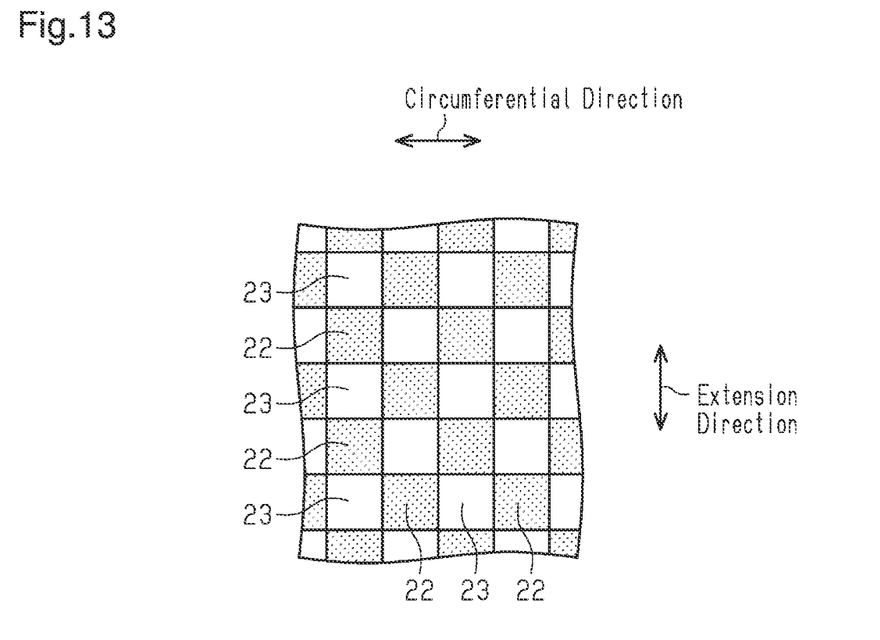
FIG. 13 is a diagram showing an arrangement of high-compression portions and low-compression portions according to another embodiment.

In the example shown in FIG. 13, the high-compression portions 22 and the low-compression portions 23 are quadrilateral plates each having the outer shape of a square as viewed in the thickness direction. The high-compression portions 22 and the low-compression portions 23 are arranged alternately in the circumferential direction (left-right direction as viewed in FIG. 13) and arranged alternately in the extension direction (the up-down direction as viewed in FIG. 13).

Figure 14:
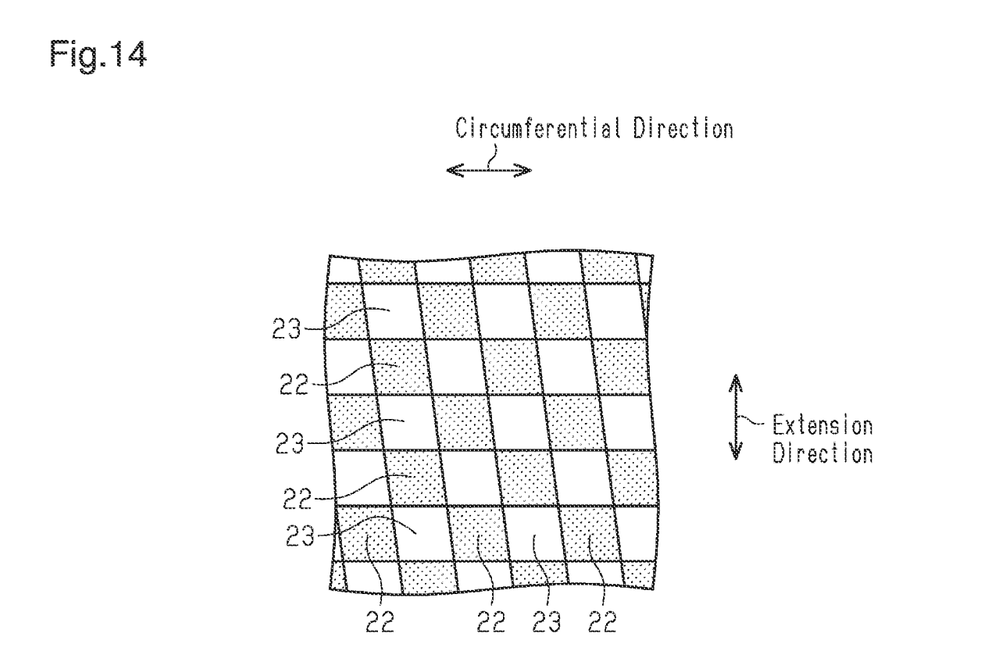
FIG. 14 is a diagram showing an arrangement of high-compression portions and low-compression portions according to another embodiment.

In the example shown in FIG. 14, the high-compression portions 22 and the low-compression portions 23 are quadrilateral plates each having the shape of a parallelogram as viewed in the thickness direction. The high-compression portions 22 and the low-compression portions 23 are arranged alternately in the circumferential direction (left-right direction as viewed in FIG. 14) and arranged alternately in a direction that intersects with the circumferential direction and is not parallel with the center line of the peripheral wall (obliquely upward and leftward direction as viewed in FIG. 14).

Figure 15:
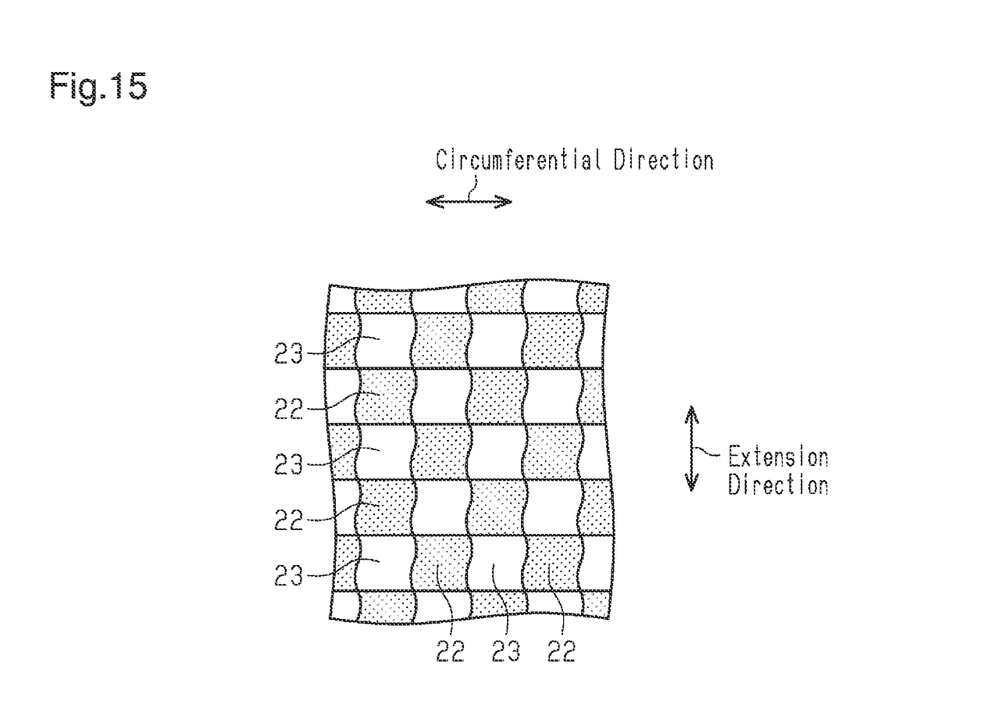
FIG. 15 is a diagram showing an arrangement of high-compression portions and low-compression portions according to another embodiment.

The outer shapes of the high-compression portions 22 and the low-compression portions 23 as viewed in the thickness direction are not limited to a quadrilateral such as a square, a rectangle, a rhombus, or a parallelogram, but may be any shape. For example, the outer shape of the high-compression portions 22 and the low-compression portions 23 as viewed in the thickness direction may be a shape having four corners and four sides including at least one wavy side. In the example shown in FIG. 15, the outer shape of the high-compression portions 22 and the low-compression portions 23 as viewed in the thickness direction is a shape having four corners and two wavy sides.

The shapes of all of the high-compression portions 22 and the low-compression portions 23 as viewed in the thickness direction do not necessarily need to be identical. Some of the high-compression portions 22 and the low-compression portions 23 may have shapes different from the others. Alternatively, the high-compression portions 22 and the low-compression portions 23 may all have different shapes. For example, the outer shapes of the high-compression portions 22 and the low-compression portions 23 as viewed in the thickness direction may be a square in part of the compressed fiber portion and a rectangle formed by combining two squares in the other parts.

The high-compression portions 22 do not necessarily need to be arranged continuously over the entire length in the extension direction of the peripheral wall 21 (or the compressed fiber portion 47). The high-compression portions 22 may be arranged in a discontinuous manner.

The high-compression portions 22 and the low-compression portions 23 may be connected smoothly to each other without a step on the inner surface of the peripheral wall of the air intake duct, while the high-compression portions 22 and the low-compression portions 23 are connected to each other via a step on the outer surface of the peripheral wall. The high-compression portions 22 and the low-compression portions 23 may be connected to each other via a step both on the inner surface and the outer surface of the peripheral wall of the air intake duct. For easy installation of the air intake duct, one of the inner surface or the outer surface of the peripheral wall of the air intake duct is preferably smooth.

The air intake ducts of the above-described embodiments are not limited to the air intake duct 20, which includes the cylindrical peripheral wall 21 or the air intake duct 40 including a quadrilateral tube-shaped peripheral wall 41, but may be an air intake duct having a tubular peripheral wall of any cross-sectional shape. For example, the air intake duct may have an elliptic, stadium-shaped, or hexagonal cross section. That is, the air intake ducts of the above-described embodiments may be employed as any air intake duct with a peripheral wall having an annular cross-sectional shape. In this case, the term "annular" refers to any structure that forms a loop, which is a continuous shape with no ends. "Annular" shapes include but are not limited to a circular shape, an elliptic shape, and a polygonal shape with sharp or rounded corners.

DESCRIPTION OF THE REFERENCE NUMERALS 20, 40 . . . Air intake ducts; 21, 41 . . . Peripheral Walls; 22 . . . High-Compression Portion; 23 . . . Low Compression Portion; 24, 44 . . . Circumferentially Extending Sections; 25, 45 . . . Axially Extending Sections; 47 . . . Compressed Fiber Portion; 50 . . . Duct Body; 51 . . . Bottom Wall; 52 . . . Open Window

The invention claimed is:

1. An air intake duct for an internal combustion engine, comprising a peripheral wall having an annular cross-sectional shape, wherein
    at least part of the peripheral wall is formed by a compressed fiber portion that is made of a compression molded fiber material,
    the compressed fiber portion includes high-compression portions and low-compression portions, the low-compression portions being formed through compression molding at a compression ratio lower than that of the high-compression portions,
    the high-compression portions include a circumferentially extending section,
    the circumferentially extending section is located in a plane that is perpendicular to an extension direction of the peripheral wall with at least part of the circumferentially extending section disposed between the low-compression portions, and
    the circumferentially extending section extends continuously over an entire length of the compressed fiber portion in a circumferential direction of the peripheral wall.

2. The air intake duct for an internal combustion engine according to claim 1, wherein
    the compressed fiber portion includes an annular cross-sectional shape, and
    the circumferentially extending section has an annular shape that extends in the circumferential direction.

3. The air intake duct for an internal combustion engine according to claim 1, wherein
    the high-compression portions include an axially extending section, and
    the axially extending section extends continuously over an entire length of the compressed fiber portion in the extension direction of the peripheral wall with part of the axially extending section disposed between the low-compression portions.

4. The air intake duct for an internal combustion engine according to claim 1, wherein
    the high-compression portions and the low-compression portions are quadrilateral plates having an identical outer shape as viewed in a thickness direction of the peripheral wall,
    the high-compression portions and the low-compression portions are arranged alternately in a first direction and in a second direction, and
    adjacent ones of the high-compression portions are connected to each other at corners of the shapes of quadrilateral plates.

5. The air intake duct for an internal combustion engine according to claim 4, wherein the outer shape is a rhombus shape including a diagonal line located in a plane perpendicular to the extension direction of the peripheral wall.

* * * * *